3,179,650
POLYAZO DYES
Walter Wehrli, Riehen, Basel, and Heinz Wicki, Allschwil, Basel-Land, Switzerland, assignors to Sandoz Ltd., Basel, Switzerland
No Drawing. Filed Oct. 4, 1962, Ser. No. 228,236
Claims priority, application Switzerland, Oct. 16, 1961, 11,956/61
9 Claims. (Cl. 260—158)

This invention relates to a process for the production of polyazo dyes of the formula

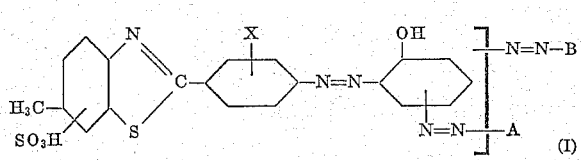

wherein

A represents the radical of a diazo component of the hydroxyaminonaphthalene sulfonic acid series,
B the radical of a diazo component which may contain azo bridges, and
X hydrogen or a sulfonic acid group.

The process of the invention comprises reacting 1 mole of a diazotized hydroxyaminonaphthalene sulfonic acid with 1 mole of a compound of the formula

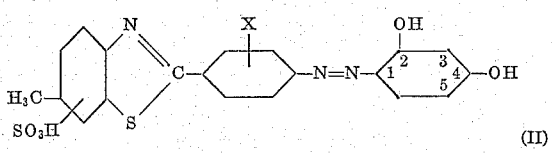

and subsequently with 1 mole of any desired diazo component, e.g., diazo components of the benzene, diphenyl and naphthalene series.

The preferred dyes are those which are obtained when the coupling product of 1 mole of diazotized dehydrothiotoluidine sulfonic acid and 1 mole of 1,3-dihydroxybenzene is reacted with 1 mole of diazotized 1-amino-8-hydroxynaphthalene-3,6-disulfonic acid and the resulting product converted with 1 mole of a substituted diazotized aminonitrobenzene, preferably 1-amino-4-nitrobenzene, into the final dye.

A compound of Formula II is reacted preferably with a hydroxyaminonaphthalene sulfonic acid at pH values between 7.5 and 11, or preferably pH 8.5–9, and at temperatures of 0° to 30° C. in an aqueous medium.

An organic solvent, e.g., pyridine, can be added to the reaction medium. The products thus obtained can be coupled with a further diazo component of any desired type in aqueous medium at temperatures from 0° to 30° C. and pH values from 4.5 to 11, if necessary with the addition of an organic solvent such as pyridine.

The dyes obtained are used for the dyeing and printing of leather and give brilliant yellowish or reddish shades of medium to dark brown.

The dyes have very good level dyeing properties, give consistent shades on leather of varying degrees of tannages, and have good building-up properties in neutral to weakly acid dyebaths, excellent solubility in water, very good stability to acids and alkalis, good buffing fastness on chrome suede leather, very good migration fastness on polyvinyl chloride and rubber crepe, very good fastness to formaldehyde, very good hot pressing fastness and good light fastness.

In the following examples the parts and percentages are by weight and the temperatures in degrees centigrade.

Example 1

338 parts (1 mole) of dehydrothiotoluidine monosulfonic acid are diazotized in the usual manner with 69 parts of sodium nitrite in hydrochloric acid solution, and then coupled in soda-alkaline solution with 110 parts (1 mole) of 1,3-dihydroxybenzene to give the basic scheme of the monoazo compound of Formula II.

319 parts (1 mole) of 1-amino-8-hydroxynaphthalene-3,6-disulfonic acid are diazotized in the normal way with 69 parts of sodium nitrite in hydrochloric acid solution, and coupled in soda-alkaline solution with the monoazo compound of Formula II, preferably in the 3-position of the resorcin nucleus. The product is coupled in acetic acid medium with the diazo compound of 138 parts (1 mole) of 1-amino-4-nitrobenzene, preferably in the 5-position of the resorcin nucleus, and the final dye salted out with common salt. The dye is a brown powder readily soluble in water, which dyes leather in medium yellow-brown shades of excellent levelness.

The dye has very good level-dyeing properties, gives a consistent shade on leathers of varying tannages, has good building-up properties in neutral and weakly acid dyebaths, excellent solubility in water, very good stability to acids and alkalis, good buffing fastness on chrome suede leather, very good migration fastness on polyvinyl chloride and rubber crepe, very good formaldehyde fastness, very good hot pressing fastness, and good light fastness.

Example 2

The diazo compound of 319 parts (1 mole) of 1-amino-8-hydroxynaphthalene-3,6-disulfonic acid is coupled in soda-alkaline solution with the monoazo compound of Formula II, preferably in the 3-position of the resorcin nucleus. The resulting disazo dye is coupled in the 5-position of the resorcin nucleus and/or the 7-position of the 1-azo-8-hydroxynaphthalene-3,6-disulfonic acid in soda-alkaline solution with the diazotized monoazo dye obtained by diazotization of 173 parts (1 mole) of 1-aminobenzene-4-sulfonic acid and coupling in acetic acid solution with 223 parts (1 mole) of 1-aminonaphthalene-6- or -(7)-sulfonic acid.

The solution of the final dye is rendered acid to Congo paper and the dye precipitated with common salt and dried. It is obtained as a brown powder which dissolves in water to give red-brown solutions and dyes leather in dark red-brown shades of very good all-round fastness.

In the following table further dyes are enumerated which can be produced according to the procedures described in Examples 1 and 2. In column A the basic scheme of the dyes of Formula II is given and in columns B and C the further components which are suitable for the synthesis of dyes of Formula I. In column D is noted the shade of the dyeing on leather.

| Example No. | A | B | C | D |
|---|---|---|---|---|
| 3 | Dehytrothiotoluidine sulfonic acid→1, 3-dihydroxy-benzene. | 1-amino-8-hydroxynaphthalene-3, 6-disulfonic acid. | 1-amino-4-nitrobenzene-6-sulfonic acid. | Yellow-brown. |
| 4 | ---do--- | 1-(4'-aminobenzoylamino)-8-hydroxynaphthalene-3, 6-disulfonic acid. | ---do--- | Brown. |
| 5 | ---do--- | ---do--- | 1-amino-4-nitro-2-chlorobenzene. | Yellow-brown. |
| 6 | ---do--- | 1-amino-8-hydroxynaphthalene-4, 6-disulfonic acid. | 1-amino-3-nitrobenzene. | Do. |
| 7 | ---do--- | 2-amino-8-hydroxynaphthalene-6-sulfonic acid. | 1-amino-4-nitro-2, 6-dichlorobenzene. | Brown. |
| 8 | ---do--- | 2-amino-5-hydroxynaphthalene-7-sulfonic acid. | 1-aminobenzene-4-sulfonic acid. | Do. |
| 9 | ---do--- | 1-amino-8-hydroxynaphthalene-3, 6-disulfonic acid. | 1-amino-4-methoxybenzene. | Do. |
| 10 | ---do--- | ---do--- | 1-amino-2-methoxybenzene. | Do. |
| 11 | ---do--- | ---do--- | 1-amino-2-methoxy-benzene-5-sulfonic acid. | Do. |
| 12 | ---do--- | ---do--- | 1-amino-4-nitro-2-methoxybenzene. | Red-brown. |
| 13 | ---do--- | ---do--- | 1-amino-2-methoxy-3-nitros-5-chlorobenzene. | Brown. |
| 14 | ---do--- | ---do--- | 4-amino-4'-nitro-diphenylamine-2'-sulfonic acid. | Red-brown. |
| 15 | ---do--- | ---do--- | p-Amino-azobenzene. | Brown. |
| 16 | ---do--- | ---do--- | p-Amino-azobenzene-monosulfonic acid. | Do. |
| 17 | ---do--- | ---do--- | p-Amino-azobenzene-disulfonic acid. | Do. |
| 18 | ---do--- | ---do--- | Monoazo compound of: 1-aminobenzene-4-sulfonic acid and 1-aminonaphthalene-6-sulfonic acid. | Dark red-brown. |
| 19 | ---do--- | ---do--- | Monoazo compound of: 1-aminobenzene-4-sulfonic acid and 1-amino-2-methylbenzene. | Red-brown. |
| 20 | ---do--- | ---do--- | Monoazo compound of: 4-amino-4'-nitrodiphenylamine-2'-sulfonic acid and 1-amino-2, 5-di- and 1-amino-2, 5-dimethylbenzene. | Dark red-brown. |
| 21 | ---do--- | ---do--- | Monoazo compound of: 1-amino-4-nitrobenzene-6-sulfonic acid and 1-amino-2-methoxybenzene. | Brown. |
| 22 | ---do--- | ---do--- | Monoazo compound of: 1-amino-2-methoxy-4-nitrobenzene and 1-amino-3-methyl-6-methoxybenzene. | Red-brown. |
| 23 | ---do--- | ---do--- | 1-amino-4-nitro-2-chlorobenzene. | Yellow-brown. |
| 23a | dehydrothiotoluidine-disulfonic acid→ 1.3-dihydroxy-benzene. | ---do--- | p-Aminoazobenzene-disulfonic acid. | Brown. |

*Example 24*

The diazo compound of 319 parts (1 mole) of 1-amino-8-hydroxynaphthalene-3,6-disulfonic acid is coupled in soda-alkaline solution with the monoazo compound of Formula II, preferably in the 3-position of the resorcin nucleus. The resulting disazo dye is coupled in the 5-position of the resorcin nucleus and/or the 7-position of the 1-azo-3-hydroxynaphthalene-3,6-disulfonic acid in soda-alkaline solution with the diazotized monoazo dye obtained by diazotization of 309 parts (1 mole) of 4'-amino-4-nitrodiphenylamine-2-sulfonic acid and coupling in acetic acid solution with 223 parts (1 mole) of 1-aminonaphthalene-6- or -(7) sulfonic acid.

The solution of the final dye is made acid to Congo paper and the dye precipitated with common salt and dried. It is a brown powder which dissolves in water with a yellow-brown coloration and dyes leather in dark yellow-brown shades of very good all-round fastness.

*Dyeing Example A*

100 parts of freshly tanned and neutralized chrome grain leather are entered into a dyebath of 250 parts of water at 65° and 1 part of the dye obtained as described in Example 1. The leather is drummed for 30 minutes, then 2 parts of an anionic fat liquor based on sulfonated train oil are added, and drumming continued for 30 minutes. The leather is dried and finished in the normal way. It is dyed a very level shade of medium yellow-brown.

*Dyeing Example B*

100 parts of calf suede leather are wetted back in the drum for 4 hours with 1000 parts of water and 2 parts of ammonia. The leather is then dyed for 1½ hours in the drum from a bath prepared with 500 parts of water at 65°, 2 parts of ammonia and 10 parts of the dissolved dye described in Example 2. Subsequently, 4 parts of 85% formic acid are slowly added to exhaust the bath and dyeing continued until complete fixation of the dye. The suede leather is rinsed, dried and finished in the usual manner, and rebuffed. It is dyed in a very level red-brown shade.

*Dyeing Example C*

100 parts of chrome lambskin, are drum dyed for 45 minutes from a bath of 1000 parts of water at 55° containing 10 parts of the dye produced according to Example 3 and 1.5 parts of an anionic sperm oil emulsion. 5 parts of 85% formic acid are slowly added over 30 minutes to bring about fixation of the dyeing. After drying and finishing, a leather dyed in a dark yellow-brown shade of good levelness is obtained.

*Dyeing Example D*

A solution is prepared with 20 parts of the dye produced according to Example 4, 150 parts of ethyl glycol and 2 parts of 85% formic acid dissolved in 847 parts of water. It is applied to the grain side of a buffed, combination tanned side leather by spraying, pouring or plush padding. The leather is dried under mild conditions. A level surface dyeing is obtained which serves as a ground coat for a finish with opaque pigments and synthetic resin binders.

Formula of the representative dyestuffs of the foregoing examples are as follows:

Example 1:

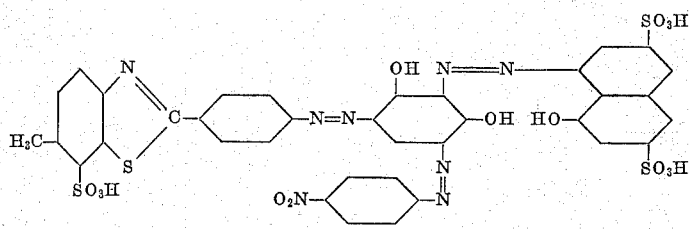

Example 2:

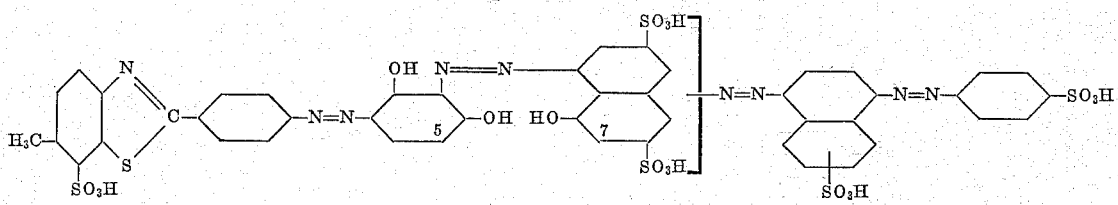

Example 24:

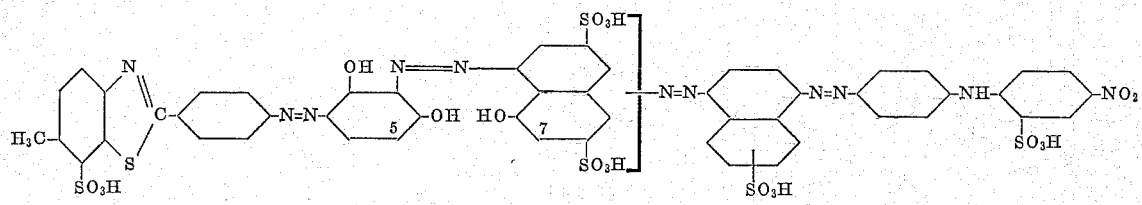

Example 16:

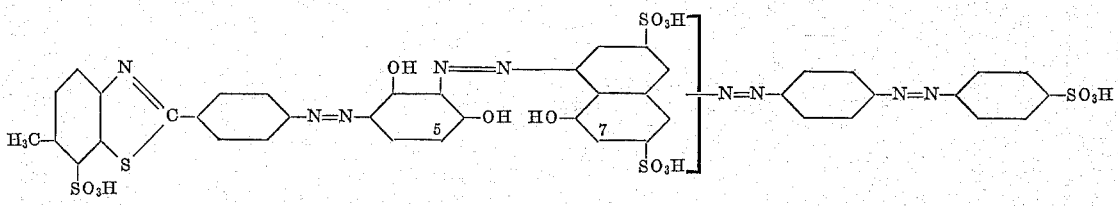

Example 23:

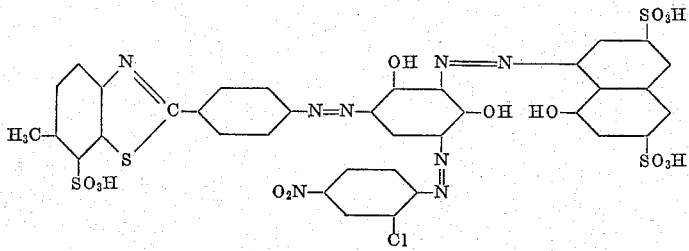

Having thus disclosed the invention what we claim is:
1. A polyazo dye of the formula

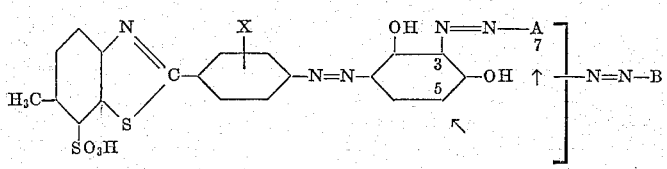

wherein
A is the radical of a diazo component selected from the group consisting of 1-amino-8-hydroxynaphthalene-3,6-disulfonic acid, 1-(4'-aminobenzoylamino)-8-hydroxynaphtha-3,6-disulfonic acid, 1-amino-8-hydroxynaphthalene-4,6-disulfonic acid, 2-amino-8-hydroxynaphthalene-6-sulfonic acid and 2-amino-5-hydroxynaphthalene-7-sulfonic acid,
B is a diazo component radical selected from the group consisting of (a) a radical of the benzene series bearing a substituent selected from the group consisting of chloro, dichloro, nitro, lower alkoxy, lower alkyl, di-lower alkyl, sulfonic acid, nitro-sulfo-phenylamino, phenylazo, sulfo-phenylazo, (nitro-sulfo-phenylamino)-phenylazo, nitro-sulfo-phenylazo, lower alkoxy-nitro-phenylazo, and of (b) a radical of the 1-amino-naphthalene-monosulfonic acid series bearing a substituent selected from the group consisting of sulfo-phenylazo and (nitro-sulfo-phenylamino)-phenazo,
and X is a member selected from the group consisting of hydrogen and a sulfonic acid group,
the —N=N—B group being attached in one of the positions selected from the group consisting of position 5 of the resorcin nucleus and position 7 of the 1-azo-8-hydroxynaphthalene sulfonic acid nucleus.

2. The polyazo dye of the formula
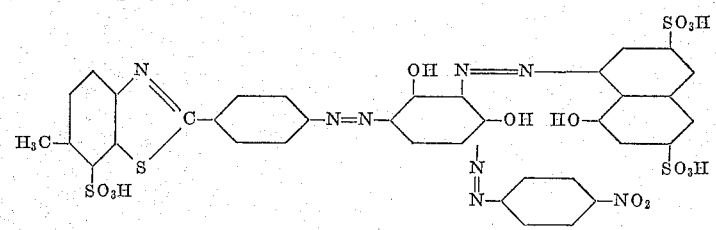
3. The polyazo dye of the formula
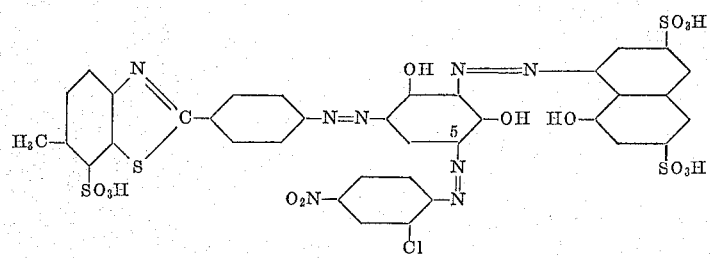
4. The polyazo dye of the formula
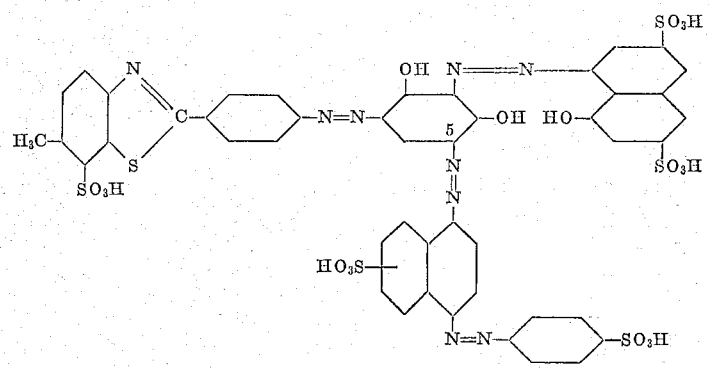
5. The polyazo die of the formula
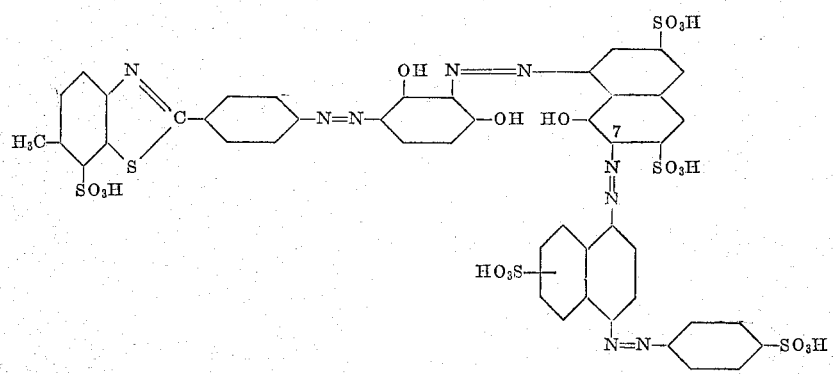
6. The polyazo dye of the formula
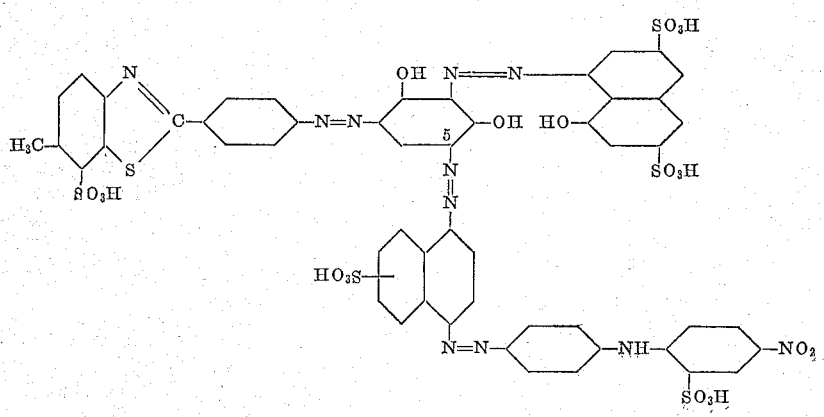

7. The polyazo dye of the formula
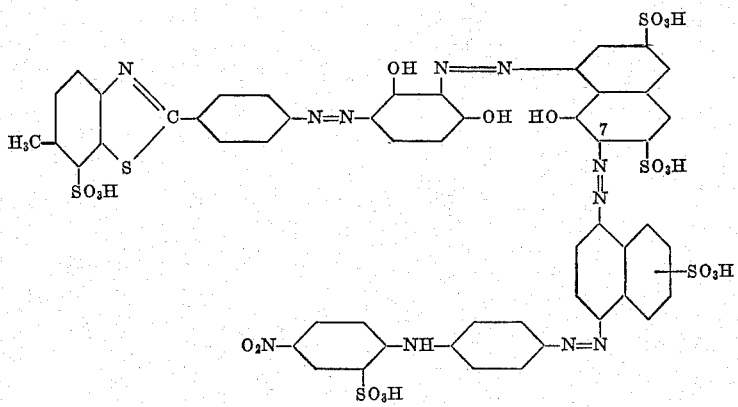
8. The polyazo dye of the formula
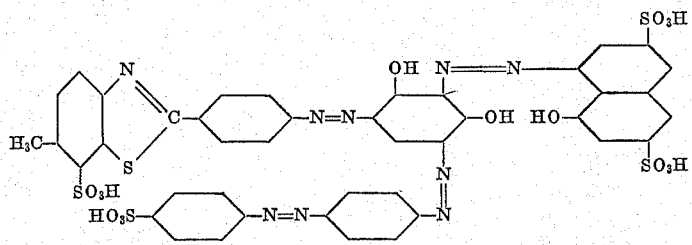
9. The polyazo dye of the formula
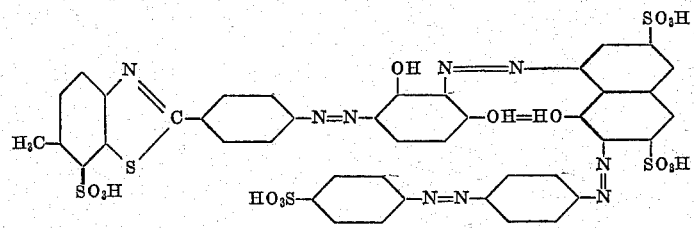
References Cited by the Examiner
UNITED STATES PATENTS
| | | | |
|---|---|---|---|
| Re. 22,046 | 3/42 | Fellmer | 260—158 X |
| 1,667,327 | 4/28 | Mayer | 260—158 |
CHARLES B. PARKER, *Primary Examiner.*